United States Patent

Ueno

[19]

[11] Patent Number: 6,031,808
[45] Date of Patent: Feb. 29, 2000

[54] OPTICAL DISC, FORMED FROM JOINING INDIVIDUAL DISCS AND METHOD AND APPARATUS FOR MANUFACTURING AND USING SUCH OPTICAL DISC

[75] Inventor: Ichiro Ueno, Isehara, Japan

[73] Assignee: Victor Company of Japan, Ltd., Yokohama, Japan

[21] Appl. No.: 08/968,141

[22] Filed: Nov. 12, 1997

[30] Foreign Application Priority Data

Nov. 12, 1996 [JP] Japan .................................. 8-316983

[51] Int. Cl.⁷ ..................................................... G11B 7/00
[52] U.S. Cl. .................... 369/111; 369/275.2; 369/275.3; 369/286
[58] Field of Search .............. 369/58, 111, 275.1–275.5, 369/280, 283, 286

[56] References Cited

U.S. PATENT DOCUMENTS

| | | |
|---|---|---|
| 4,466,091 | 8/1984 | Takagi et al. . |
| 4,825,430 | 4/1989 | Halter et al. .......................... 369/286 X |
| 4,879,704 | 11/1989 | Takagi et al. ........................... 369/58 X |
| 5,173,886 | 12/1992 | Satoh et al. ....................... 369/275.3 X |
| 5,247,494 | 9/1993 | Ohno et al. ................................. 369/13 |
| 5,796,712 | 8/1998 | Moribe et al. ................... 369/275.1 X |
| 5,812,519 | 9/1998 | Kawamura et al. .................. 369/275.1 |
| 5,815,333 | 9/1998 | Yamamoto et al. .............. 369/275.3 X |
| 5,825,728 | 10/1998 | Yoshimoto et al. .................. 369/58 X |
| 5,835,479 | 11/1998 | Miyagawa et al. ................ 369/275.2 |

FOREIGN PATENT DOCUMENTS

| | | |
|---|---|---|
| 1-286135 | 11/1989 | Japan . |
| 2-042652 | 2/1990 | Japan . |
| 2-165422 | 6/1990 | Japan . |
| 2-235227 | 9/1990 | Japan . |
| 4-167238 | 6/1992 | Japan . |
| 4-310655 | 11/1992 | Japan . |
| WO 90/14663 | 11/1990 | WIPO . |

OTHER PUBLICATIONS

Patent Abstracts of Japan, vol. 7, No. 224 (P–227), for JP 58–114343, Oct. 5, 1983.
Patent Abstracts of Japan, vol. 14, No. 201 (P–1041), for JP 2–42652, Apr. 24, 1990.

*Primary Examiner*—W. R. Young
*Attorney, Agent, or Firm*—Eugene Lieberstein; Michael N. Meller

[57] ABSTRACT

A read only memory (ROM) disc 10 has an annular ROM area 12 in an outer area thereof, and a random access memory (RAM) disc 20 has an annular RAM area 22 in an inner area thereof. The ROM disc and the RAM disc are manufactured independently each other under respective preferable conditions. An optical disc 30 is provided by adhering the ROM disc and the RAM disc each other. An optical pickup 32 reproduces the optical disc or records thereon by irradiating a light from one side thereof.

8 Claims, 8 Drawing Sheets

OPTICAL DISC, FORMED FROM JOINING INDIVIDUAL DISCS AND METHOD AND APPARATUS FOR MANUFACTURING AND USING SUCH OPTICAL DISC

BACKGROUND OF THE INVENTION

1. Field of the Invention

The present invention relates to an optical disc and an optical disc recording/reproducing apparatus and particularly relates to an optical disc having a preliminary recorded area for reproducing, an area for so called write once which can be reproduced plural of times, and an area for recording and reproducing for many times, and a manufacturing method of the optical disc, and a recording/reproducing apparatus for the optical disc.

2. Description of the Related Art

There are some kinds of optical discs such a ROM (read only memory) disc on which an information is prerecorded, a WO (write once) disc on which an information can be recorded once and reproduced repeatedly, and a RAM (random access memory) disc which an information can repeatedly be recorded on and reproduced from.

There are many kinds of ROM discs such as a CD (compact disc), a CD-ROM, and an LD (laser disc). These are used for delivering media of mass produced softwares or information programs of such as audio, video, or computer program at a moderate price. However, a user cannot record an information on such ROM disc.

On the other hand, as well known, there are the WO disc and the RAM disc, on which an information can be recorded (these discs will be called a "RAM disc" hereafter). The RAM disc has an advantage of not only being able to reproduce an information, but also being able to record an information. On the contrary, the RAM disc is not suited for mass production, because it is difficult to produce a replica thereof.

An optical disc having merits of both of the ROM disc and the RAM disc, which has an exclusive area (ROM area) for reproducing, and another exclusive area for a function of WO or RAM (an area for a function of WO or RAM will be called a "RAM area" hereafter) is disclosed in the following prior arts; Japanese Patent Laid-Open Application No. 1-286135/1989, Japanese Patent Laid-Open Application No. 2-42652/1990, Japanese Patent Laid-Open Application No. 2-235227/1990, Japanese Patent Laid-Open Application No. 4-167238/1992, and Japanese Patent Laid-Open Application No. 4-310655/1992.

Japanese Patent Laid-Open Application No. 1-286135/1989, Japanese Patent Laid Open Application No. 2-42652/1990, Japanese Patent Laid-Open Application No. 2-235227/1990, and Japanese Patent Laid-Open Application No. 4-167238/1992 disclose an optical disc having information pits in an exclusive area for reproducing and a guide groove for guiding a pickup in a RAM area, which are formed on a same plane of the optical disc by a method such as injection molding. The RAM area may be formed on the optical disc by selectively depositing a recording material on the surface thereof or depositing the recording material on the entire surface of thereof and removing selectively the recording material by etching. Japanese Patent Laid-Open Application No. 4-310655/1992 discloses an optical disc comprised of adhered two plates, one of which is a ROM plate and another a RAM plate. To operate the optical disc of adhered two plates, an optical beam has to irradiate each plate thereof.

The prior arts mentioned before have shortages described in the following.

Adequate values of depth and width of the pit of the ROM area and those of the groove of the RAM area are essentially different each other. In general, the adequate depth of the pit of the ROM area is deeper than that of the groove of the RAM area, and the width of the pit is narrower than that of the groove. Accordingly, it is difficult to provide both of the ROM area and the RAM area on a same plane of the optical disc of high density and high quality by utilizing technologies disclosed in Japanese Patent Laid-Open Application No. 1-286135/1989, Japanese Patent Laid-Open Application No. 2-42652/1990, Japanese Patent Laid-Open Application No. 2-235227/1990, and Japanese Patent Laid-Open Application No. 4-167238/1992, for obtaining good repeatability and inter-changeability of the optical disc.

Japanese Patent Laid-Open Application No. 1-286135/1989 discloses a method of depositing a recording material by sputtering or vacuum evaporation after the pits and the groove are formed by injection moulding. In this case, an exposure condition of a laser beam to a photoresist formed on a glass disc is controlled so as to form the pits and the groove having predetermined values of depth and width. However, it is especially difficult to form the groove with a good repeatability due to a sensitivity dispersion of photoresist.

Japanese Patent Laid-Open Application No. 2-42652/1990 and Japanese Patent Laid-Open Application No. 4-167238/1992 disclose a depositing method of recording material by spin coating after the pit and the groove are formed by injection molding. However, it is difficult to control the depth and the width of the groove with good repeatability as the groove tends to be filled with the recording material in the spin coating process.

Japanese Patent Laid Open Application No. 2-235337/1990 discloses such a disc that a ROM area is formed first over a surface of an optical disc, thereafter a phase change material is deposited to cover the full surface thereof. The ROM area underneath is exposed by removing selectively the phase change material in such a manner that the area to be removed to expose the ROM area is irradiated by a weak light, such as a laser power of 1.5 mW, then removed by sputtering etching process. Another area of the phase change material is irradiated by a strong light, such as a laser power of 5 mW, so as to leave the area as the RAM area, as the area irradiated by the strong light is resistant to sputtering etching process. Such a phase change material for an optical disc is generally covered by a dielectric material. However, it is difficult to remove the phase change material adequately in the above etching process, because it is difficult for the irradiating light to distinguish the phase change material from the ROM area underneath, resulting that the ROM area to be not cleanly exposed in the etching process causing a rough surface thereof.

Japanese Patent Laid Open Application 4-310655/1992 discloses the optical disc having two plates, namely, one is the ROM area and another is the RAM area. When the optical disc recording/reproducing apparatus has only one optical pick up, turning over of the optical disc is needed for operating whole contents thereof and causes inconvenience to a user. When a plurarity of optical pickups are provided, the optical disc recording/reproducing apparatus becomes complicated in structure thereof, and expensive.

As mentioned before, when an information signal is reproduced from or recorded on the groove or the ridge, it is difficult to manufacture the optical disc of the prior art which has a good repeatability and interchangeability, but it may be possible to form a depth and a width of the groove into respective predetermined values by controlling an intensity of the laser beam of the optical pickup irradiating a photoresist on a glass disc. As for a DVD (digital video disc), which is now on a stage for standardization, a signal is recorded on both of the groove and the ridge, however, such practice is difficult to achieve by available technologies of the prior arts. A form of cross section of the groove of a DVD-RAM is to be a rectangular or a trapezoid, which is determined by a thickness of the photo resist. The DVD-RAM may have a ROM area, which is preferred to have a smaller recording density than that of the DVD-ROM having a ROM area only.

SUMMARY OF THE INVENTION

Accordingly, a general object of the present invention is to improve production processes of a ROM area and a RAM area of an optical disc of high density.

Another object of the present invention is to provide a production method having good production repeatability of the optical disc.

Further and another object of the present invention is to provide a recording/reproducing apparatus for an optical disc of the present invention.

Further object of the present invention is to provide a high density optical disc by adhering a ROM (read only memory) disc to a RAM (random access memory including write once) disc, which has a ROM area and a RAM area respectively thereon and the respective areas are annular or sectorial and formed positionally independent each other.

Still another object of the present invention is to provide an optical disc having an adhered ROM and RAM disc wherein the thickness of an adhesive is restricted to be smaller than the allowance of aberration of an optical pickup, and more preferable, to be smaller than the focal depth of the optical pickup.

A feature of an optical disc of the present invention is that the optical disc is manufactured by adhering a ROM disc and a RAM disc together, and at least one of a pit, a guide groove, a reflective layer, and a recording medium layer is formed on the whole area of the rear side of the disc of the adhered disc.

Another feature of the optical disc of the present invention is that a RAM area of the RAM disc has no tracking information thereon when the RAM area and a ROM area of the ROM disc are sectorial.

Further and another feature of the optical disc of the present invention is that the RAM disc of the adhered disc faces to an optical pickup.

A feature of a manufacturing method of an optical disc of the present invention includes; a step of manufacturing the ROM area of the ROM disc under its preferable conditions, a step of manufacturing the RAM area of the RAM disc under its preferable conditions, and a step of adhering the ROM disc to the RAM disc.

Other object and further features of the present invention will be apparent from the following detailed description with respect to preferred embodiments of the invention when read in conjunction with the accompanying drawings.

DETAILED DESCRIPTION OF THE PREFERRED EMBODIMENT

The present invention will now be described in detail with reference to the accompanying drawings.

At first, an optical disc and a production method of the optical disc of the present invention will be described referring to FIGS. 2 and 3.

Figure 2:
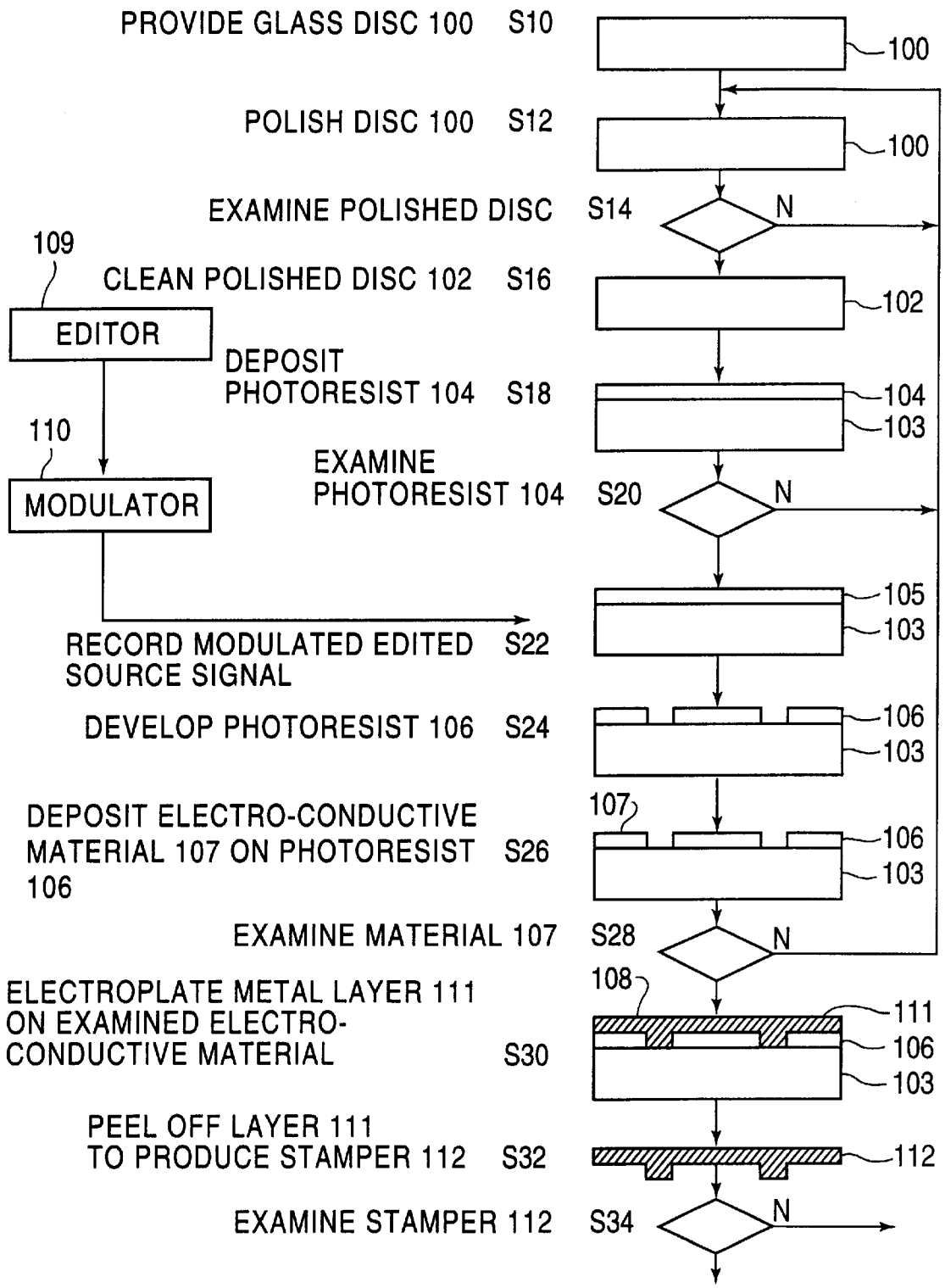
FIG. 2 shows a production process of an optical disc of 1st embodiment of the present invention.

FIG. 2 shows a production process of an optical disc of 1st embodiment of the present invention.

Figure 3:
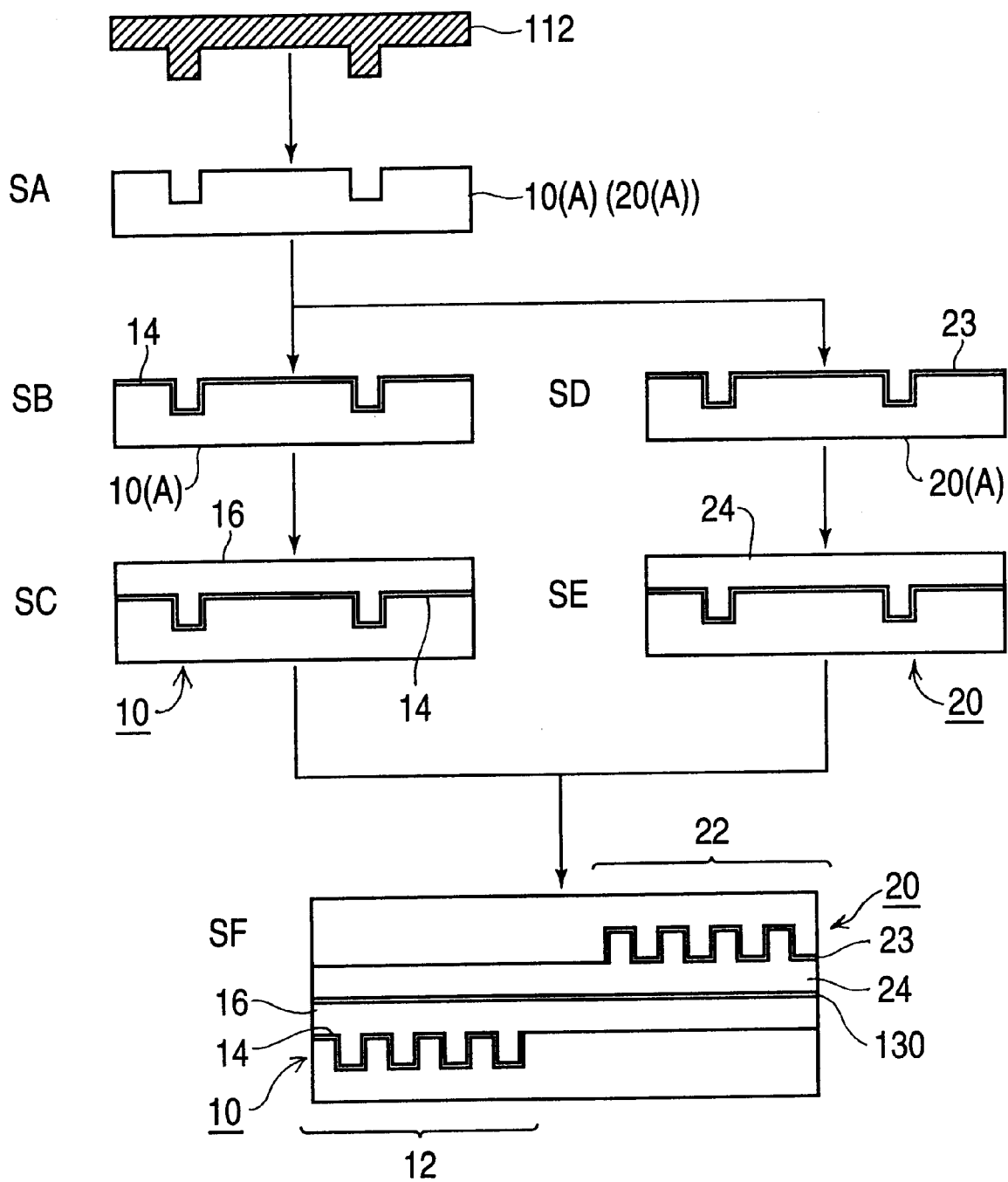
FIG. 3 shows another production process of an optical disc of 1st embodiment of the present invention.

FIG. 3 shows another production process of an optical disc of 1st embodiment of the present invention.

The production process of the optical disc starting from a glass disc 100 up to a stamper 112 will be described referring to FIG. 2. The glass disc 100 is provided (step S10). The glass disc 100 is polished (step S12). A polished glass disc (not shown) is examined (step S14). An examined polished glass disc 102 is cleaned (step S16). A photoresist 104 is deposited on a cleaned examined polished glass disc 103 (step S18). The photoresist 104 deposited on the cleaned examined polished glass disc 103 is examined (step S20). A thickness of the photoresist 104 relates to a depth of a pit or a guide groove of the optical disc.

When the optical disc is a ROM (read only memory) disc, an editing device 109 edits a source signal, then a modulating device 110 modulates an edited source signal. The modulated edited source signal modulates a laser beam. The modulated laser beam irradiates an examined photoresist 104 on the cleaned examined polished glass disc 103, and records the modulated edited source signal thereon (step S22). When the optical disc is a RAM disc, an irradiation of the laser beam records the guide groove on the examined photoresist 104. The pit or the guide groove is formed on a signal recorded photoresist 105 by developing (step S24) so that a developed photoresist 106 is produced. An electrically conductive material 107 is deposited on a developed signal recorded photoresist 106 (step S26). The electrically conductive material 107 on the developed examined photoresist 106 is examined (step S28). A metal layer 111 is electroplated on an examined electrically conductive material 108 (step S30). The metal layer 111 is peeled off from the developed examined photo resist 106 to produce a stamper 112 (step S32). The stamper 112 is examined, where a defective one is rejected, and an acceptable one is reserved for use (step S34).

A production steps of an optical disc of the present invention utilizing the stamper 112 mentioned before will be described in the following referring to FIG. 3.

A production process of a ROM disc 10 will be described in the following.

A plurarity of duplicates of a ROM disc substrate 10(A) having pits on its surface is produced by utilizing the stamper 112 by a method of injection mold or a method based on a photo-polymerization process known as the 2P process (step SA).

A reflective layer 14 is deposited on an area of a surface of the ROM disc substrate 10(A) where the pits are formed on, and the reflective layer 14 is not deposited on another area, where the pits are not formed on, by a familiar method such as shielding (step SB).

A protective layer 16 is deposited on the reflective layer 14 (step SC).

Although the reflective layer 14 is deposited on a ROM area 12 as mentioned before, an area of which the reflective layer 14 covers will be formed in a different way for the purpose of the present invention, such as mentioned in the 2nd embodiment, which will be described in the following.

Label informations containing characters and/or pictures (not shown) may be printed on the protective layer 16 if desired. Thus, the ROM disc 10 is produced.

A production process of a RAM disc 20 will be described in the following.

A plurality of duplicates of a RAM disc substrate 20(A) having guide grooves thereon are produced by a method of injection mold or the 2P process utilizing the stamper 112 (step SA).

An example of a production process of a recording layer 23 is that the recording layer 23 having both functions of recording and reflection is deposited over the guide grooves which is formed on the surface of the RAM disc substrate 20(A), and another example of a production process of the recording layer 23 is that the recording layer 23 has a recording layer and a reflective layer, the both of layers are deposited over the guide grooves thereof (step SD).

A protective layer 24 is deposited on the recording layer 23 (step SE). Thus, the RAM disc 20 is produced.

The RAM disc 20, such as a phase change recording disc and a magnetooptical recording disc, generally has a 4-layered recording layer comprising a dielectric layer, a recording layer, a dielectric layer, and a reflective layer.

Although the recording layer 23 is formed on a RAM area 22 as shown in FIG. 3, an area of which the recording layer 23 covers will be changed for the purpose of the present invention, as mentioned in the 2nd embodiment which will be described in the following.

The ROM disc 10 and the RAM disc 20 are adhered together with a thin adhesive transparent layer 130 interposed therebetween (step SF). As shown at a bottom of FIG. 3, a ROM area 12 and a RAM area 22 are horizontally displaced each other so as not to pile up vertically and horizontal shapes of the ROM and RAM areas are annular or sectorial on the disc. In FIG. 3, it is shown that the ROM area 12 is the left side, and the RAM area 22 is the right side. This configuration is convenient to read or write signals on the ROM and RAM areas irradiated by an optical beam from one side of the disc. Therefore, construction of a read and write apparatus for such a disc is simplified, and a manufacturing repeatability of a disc described above having both of ROM and RAM areas 12 and 22 thereon is improved. One of or both of the protective layers 16 and 24 may be omitted.

A thickness of the thin adhesive transparent layer 130 may be few tenth micrometers. But, as far as an adhesive strength of the thin adhesive transparent layer 130 is enough, the thinner the thickness thereof is, the better the optical characteristics of the disc becomes. The thickness thereof is preferred to be smaller than the allowable aberration of an optical lens of an optical pickup, and especially, smaller than a focal depth of the optical lens. When the thickness thereof is smaller than the focal depth of the optical lens, an optical beam emitted from the optical pickup can be focused on both surfaces of the ROM and RAM areas 12 and 22. A DVD disc is basically comprised of a plurality of adhered discs, which is 0.6 mm thick. Therefore, such an optical disc as having the ROM and RAM areas 12 and 22 by adhering them does not cost higher than the DVD disc.

[1st Embodiment]

Figure 1A:
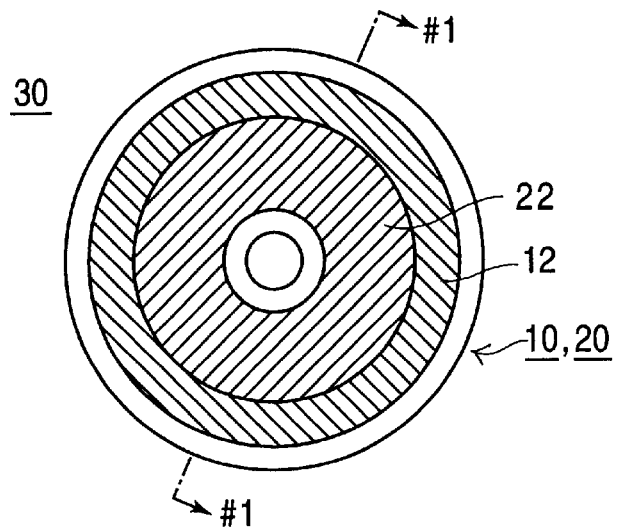
FIG. 1(A) shows a plan view of an optical disc of 1st embodiment of the present invention.

FIG. 1(A) shows a plan view of an optical disc of 1st embodiment of the present invention.

Figure 1B:
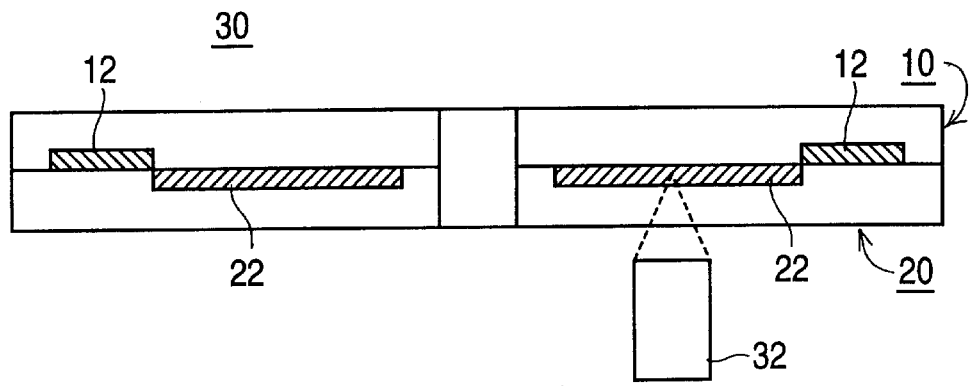
FIG. 1(B) shows a sectional view of an optical disc cut along the line #1 shown in FIG. 1(A) seen from the arrow indicating direction.

FIG. 1(B) shows a sectional view of an optical disc cut along the line #1 shown in FIG. 1(A) seen from the arrow indicating direction.

Figure 1C:
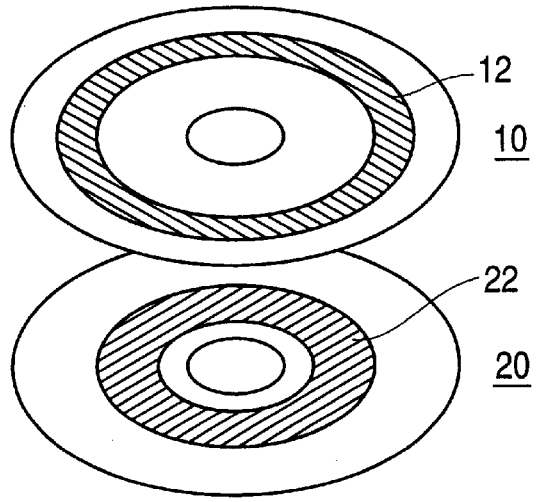
FIG. 1(C) shows an exploded view of the optical disc of 1st embodiment of the present invention.

FIG. 1(C) shows an exploded view of the optical disc of 1st embodiment of the present invention.

FIG. 2 shows a production process of an optical disc of 1st embodiment of the present invention.

FIG. 3 shows another production process of an optical disc of 1st embodiment of the present invention.

Figure 4:
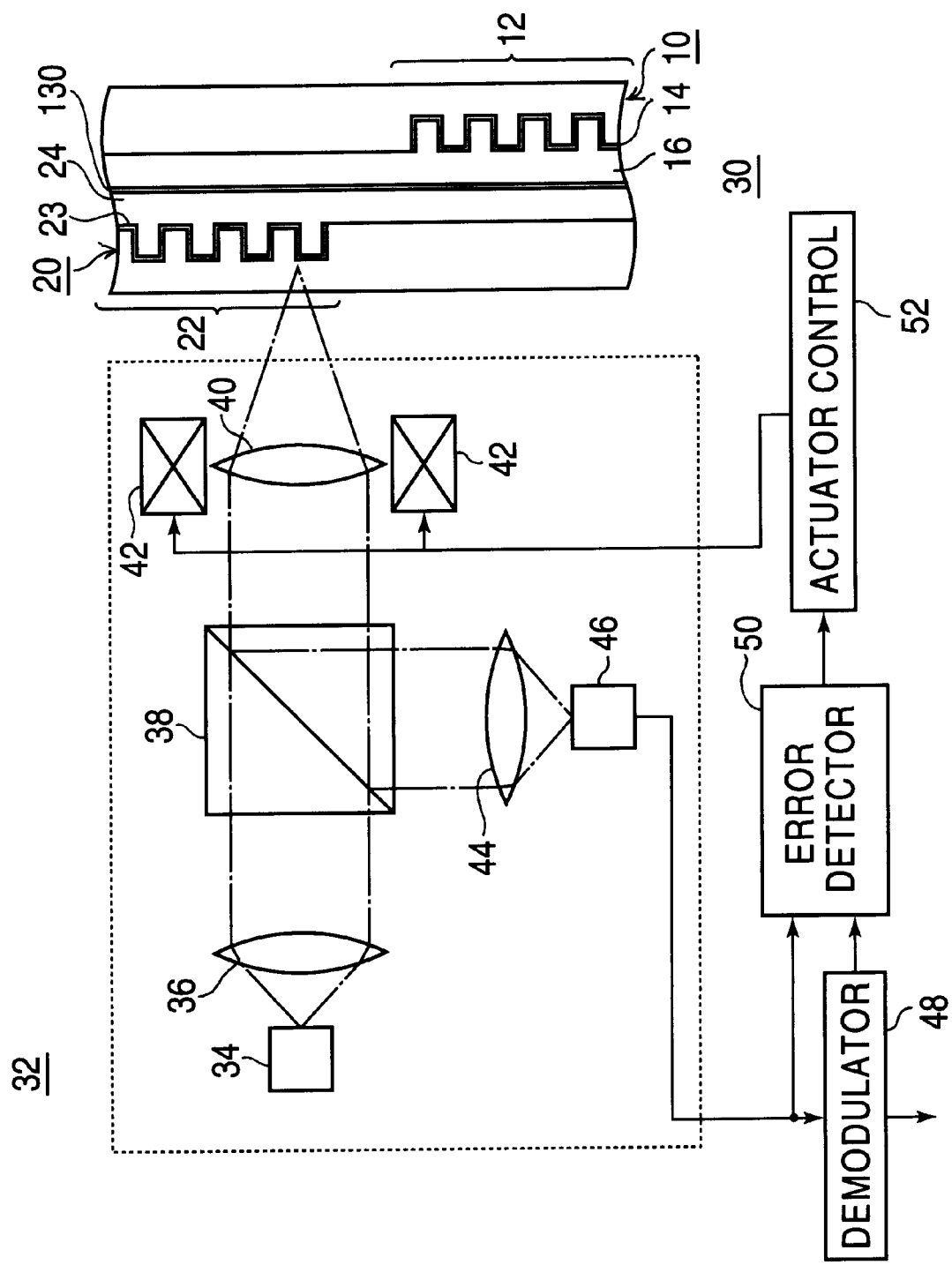
FIG. 4 shows an optical disc recording/reproducing apparatus of 1st embodiment of the present invention.

FIG. 4 shows an optical disc recording/reproducing apparatus of 1st embodiment of the present invention.

Figure 5:
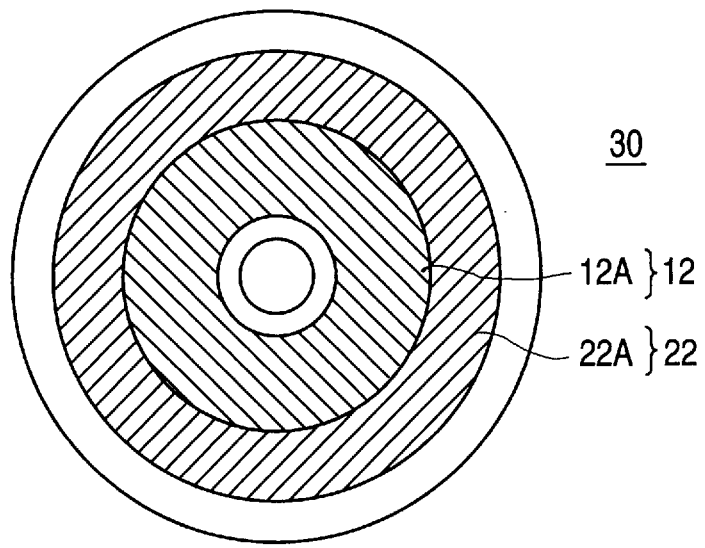
FIGS. 5(A) through 5(C) show plan views of the other optical discs of 1st embodiment of the present invention.
Figure 5:
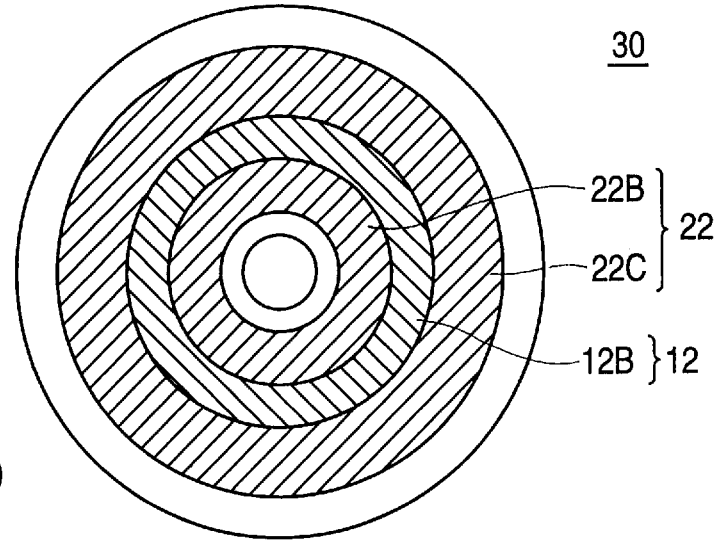
Figure 5:
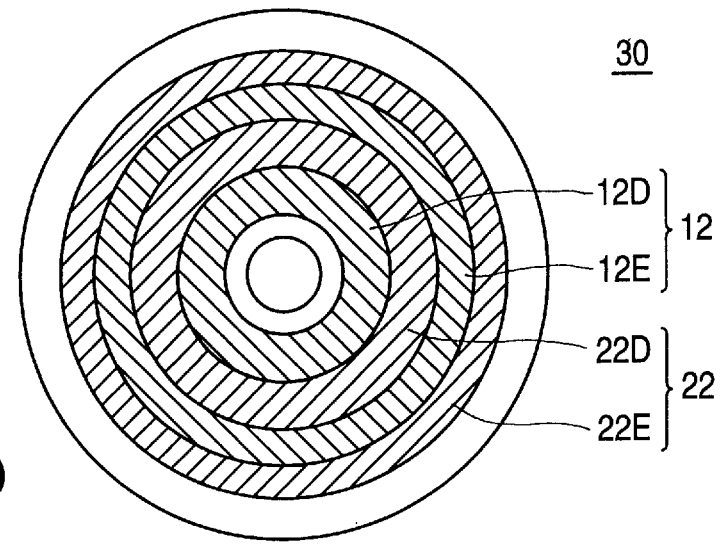

FIGS. 5(A) through 5(C) show plan views of the other optical discs of 1st embodiment of the present invention.

As shown in FIGS. 1(A) through 1(C), an optical disc 30 has a ROM area 12 in an outer annular area of the optical disc 30, and a RAM area 22 in an inner annular area thereof. The optical disc 30 is manufactured by adhering the ROM disc 10 to the RAM disc 20.

FIG. 4 shows an example of a recording/reproducing apparatus of the optical disc 30. A numeral 32 denotes an optical pickup. The recording/reproducing apparatus records and/or reproduces signals on both of a land and a guide groove of the RAM area 22. In order to operate simultaneously an optical disc having the ROM and RAM areas 12 and 22 on its respective sides, two units of optical pickups 32 have to be provided for emitting light beams thereon respectively. When the both sides of the optical disc are read and/or written from one side thereof, one optical pickup 32 may be used for reproducing and/or recording the recorded signals thereon.

In FIG. 4, a laser beam emitted from a laser 34 is refracted to parallel rays by a collimator lens 36, and then advances further into a beam splitter 38. Then the parallel rays of the laser beam passed through the beam splitter 38, are focused on the optical disc 30 by an object lens 40. When such a laser beam irradiates the RAM area 22 for recording and/or reproducing the signal thereon, the position of the object lens 40 is controlled by an actuator 42 for focusing the laser beam on the RAM area 22. Similarly, when the laser beam irradiates the ROM area 12 for reproducing the signal thereon, the actuator 42 controls the position of the object lens 40 so as to focus the laser beam on the ROM area 12.

A return of the laser beam which is reflected from the optical disc 30, is refracted by the object lens 40 and irradiates the beam splitter 38 which reflects the incident laser beam toward a condenser lens 44, then is focused on a photodetector 46, such as a photodiode.

When a signal of the ROM area 12 or the RAM area 22 is reproduced, the detector 46 outputs a detected signal, then sends the signal to a demodulator 48, which demodulates the signal and outputs as a demodulated signal. An error detector 50 detects and produces focus and tracking error signals from respective outputs of the detector 46 and the demodulator 48. These error signals are fed to an actuator control device 52. The actuator control device 52 drives the actuator 42 by responding to these error signals. Then the actuator 42 controls positions of the object lens 40, which controls focusing and tracking of the laser beam landed on the ROM area 12 or RAM area 22.

On the other hand, when a signal is recorded on the RAM area 22, the same optical pickup 32 may be used, i.e. the laser beam emitted from the laser 34 is modulated by the signal to be recorded (not shown), and thus modulated laser beam records the signal on a recording layer of the RAM area 22, according to a recording format, such as phase change recording. The error detector 50, as described before, detects and produces focus and tracking error signals from respective outputs of the detector 46, and the demodulator 48. These error signals are fed to the actuator control device 52. The actuator control device 52 drives the actuator 42 responsive to these error signals. Then the actuator 42 controls positions of the object lens 40, which controls focusing and tracking of the laser beam landed on the RAM area 22.

In this embodiment, an optical pickup 32 is provided on the side of the RAM disc 20 of the optical disc 30 as shown in FIGS. 1(B) and 4. However, the optical pickup 32 may be provided on a desired side. Generally, the optical pickup 32 is preferred to be provided on the side of the RAM disc 20. Reasons will be described below. When the laser beam emitted from the laser 34 advances within the RAM disc 20, the laser beam may be disturbed by defects including bubbles produced in or after the manufacturing process thereof. On the other hand, when the ROM area 12 of the ROM disc 10 is reproduced, the laser beam penetrates the RAM disc 20, through a thin adhesive transparent layer 130 (FIG. 4), and irradiates the ROM area 12. Therefore, the laser beam may be disturbed by the defects which belong to the RAM disc 20, and furthermore disturbed by defects including bubbles contained in the thin adhesive transparent layer 130. In this situation, the laser beam reproducing the ROM area 12 suffers more from the above disturbances than that reproducing the RAM area 22 does. In general, an operation of the RAM disc 20 is preferred to be more precise than that of the ROM disc 10, because the recording operation of a signal on the RAM area 22 is more easily disturbed by the defects than the reproducing operation of the ROM area 12 is disturbed. Accordingly, it is better that the laser beam irradiates the optical disc 30 from the side of the RAM disc 20.

FIGS. 5(A) through 5(C) show examples of layouts of the ROM area 12 and the RAM area 22 on the optical disc 30. In FIG. 5(A), the layout of the ROM area 12 and RAM area 22 is a reversal of the example shown in FIG. 1, wherein the RAM area 22 is in the outer annular area of the optical disc 30 and the ROM area 12 is in the inner annular area thereof. In FIG. 5(B), the optical disc 30 has three areas; two RAM areas in outer and inner annular areas 22c, 22B and the ROM area in a middle annular area 12B. In FIG. 5(C), the optical disc 30 has four areas, from the outer annular area to the inner annular area; the RAM area 22, the ROM area 12, the RAM area 22, and the ROM area 12 in respective annular areas 22E, 12E, 22D and 12D. In the examples of the above, each area may be replaced with another area of any.

As described before, the ROM disc 10 and the RAM disc 20 are adhered together so as not to overlap their ROM and RAM areas with each other. The ROM disc 10 and the RAM disc 20 are manufactured under their preferable conditions respectively, as they can independently be manufactured. Thus, high density recording/reproducing of the optical disc 30 is realized. Therefore, the optical disc 30 of the 1st embodiment of the present invention has an advantage that the positions of the RAM and ROM areas 22 and 12 are chosen freely thereon provided that they are not overlapped each other, and the ability of reproduction thereof is high. Another advantage thereof is that the optical pickup 32 may be provided on one side of the optical disc 30.

[2nd Embodiment]

Figure 6:
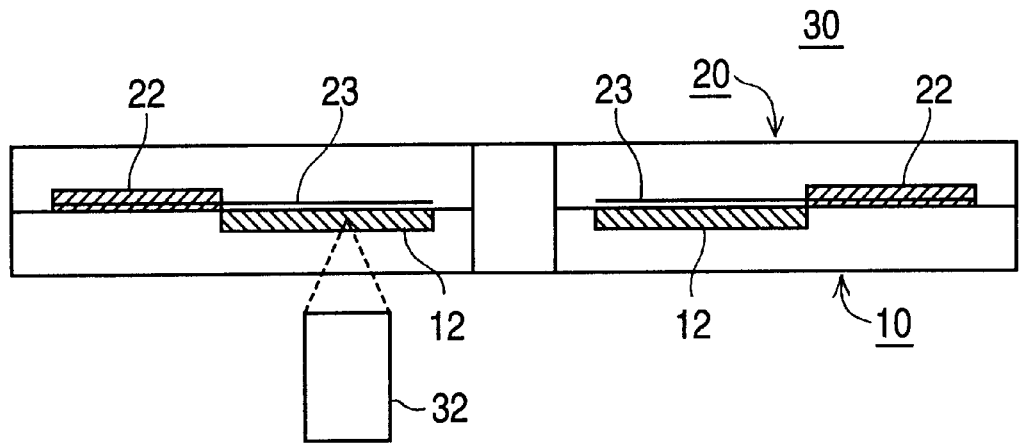
FIGS. 6(A) through 6(C) show sectional views of optical discs of 2nd embodiment of the present invention.
Figure 6:
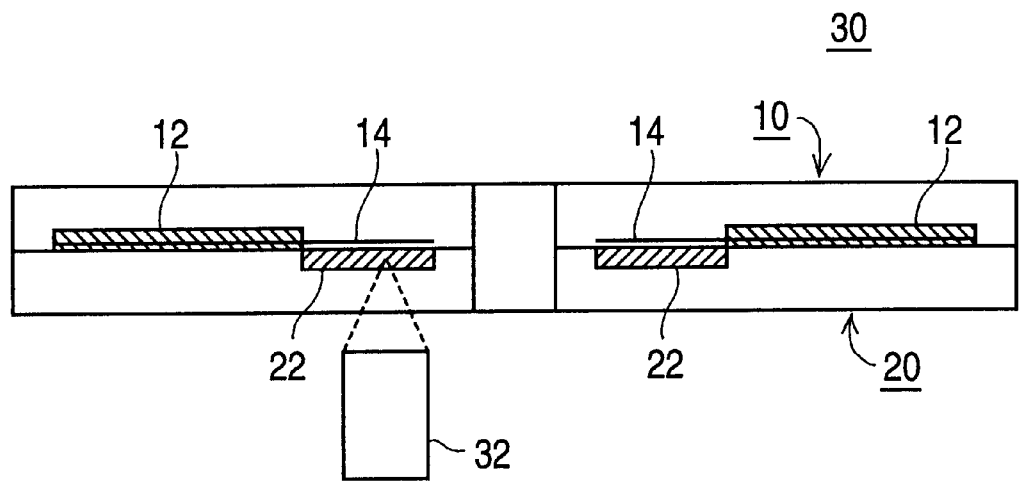
Figure 6:
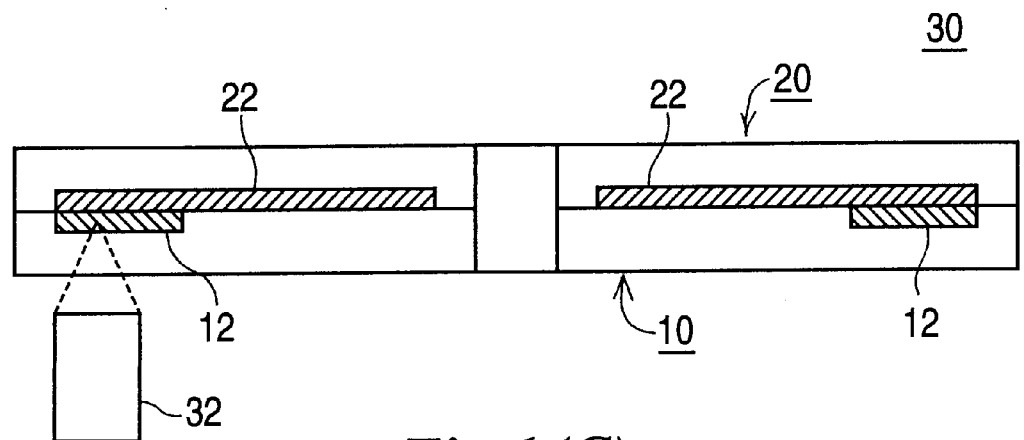

FIGS. 6(A) through 6(C) show sectional views of optical discs of 2nd embodiment of the present invention.

An explanation will be given referring to FIGS. 6(A) through 6(C).

In FIG. 6(A), a ROM disc 10 is at the front side of the optical disc 30 in relation to an incoming light of the optical pickup 32, and the RAM disc 20 is at the rear side thereof. A recording layer 23 is formed on the RAM area 22 and extends over to the back side of the ROM area 12 as shown in FIG. 6(A). In this case, the presence of the recording layer 23 does no harm on a reproducing process of the ROM area 12. The recording layer 23 is deposited on all area of the RAM disc 20 except on the outer and inner edges thereof. Therefore, there is no need to take account of that the recording layer 23 is to be covered or not by a technology such as masking when the recording layer 23 is deposited.

In FIG. 6(B), the RAM disc 20 is provided at the front side of the optical disc 30 with respect to the incoming light of the optical pickup 32, and the ROM disc 10 is provided at the rear side thereof. The ROM area 12 is provided in the outer annular area of the optical disc 30, and the RAM area 22 is provided in the inner annular area thereof. A reflective layer 14 is deposited on the ROM disc 10 from the ROM area 12 to the back of the RAM area 22. In this case, although the RAM area 22 has no reflective layer and is made of a material which requires a reflective layer, the reflective layer 14 acts as the reflective layer for the RAM area 22. Thus, the manufacturing process of the reflective layer of the RAM area 22 can be omitted, which leads to an improved productivity of optical disc.

A pit or a guide groove may be provided on the RAM area 22 which is provided on the whole area including the rear side of the optical disc 30, as far as the pit or the guide groove does not disturb the reproduction of the ROM area 12. In FIG. 6(C), the ROM disc 10 is provided at the front side of the optical disc 30 with respect to the incoming light of the optical pickup 32, and the RAM disc 20 is provided at the rear side thereof. The RAM area 22 which includes the guide groove (not shown), a recording layer 23 (not shown) and the reflective layer (not shown) is provided on the whole surface of the RAM disc 20. Even though the ROM area 12 has no reflective layer 14 of its own, the incoming light of the optical pickup 32 irradiates the ROM area 12 and then is reflected by the RAM area 22.

[3rd Embodiment]

Figure 7:
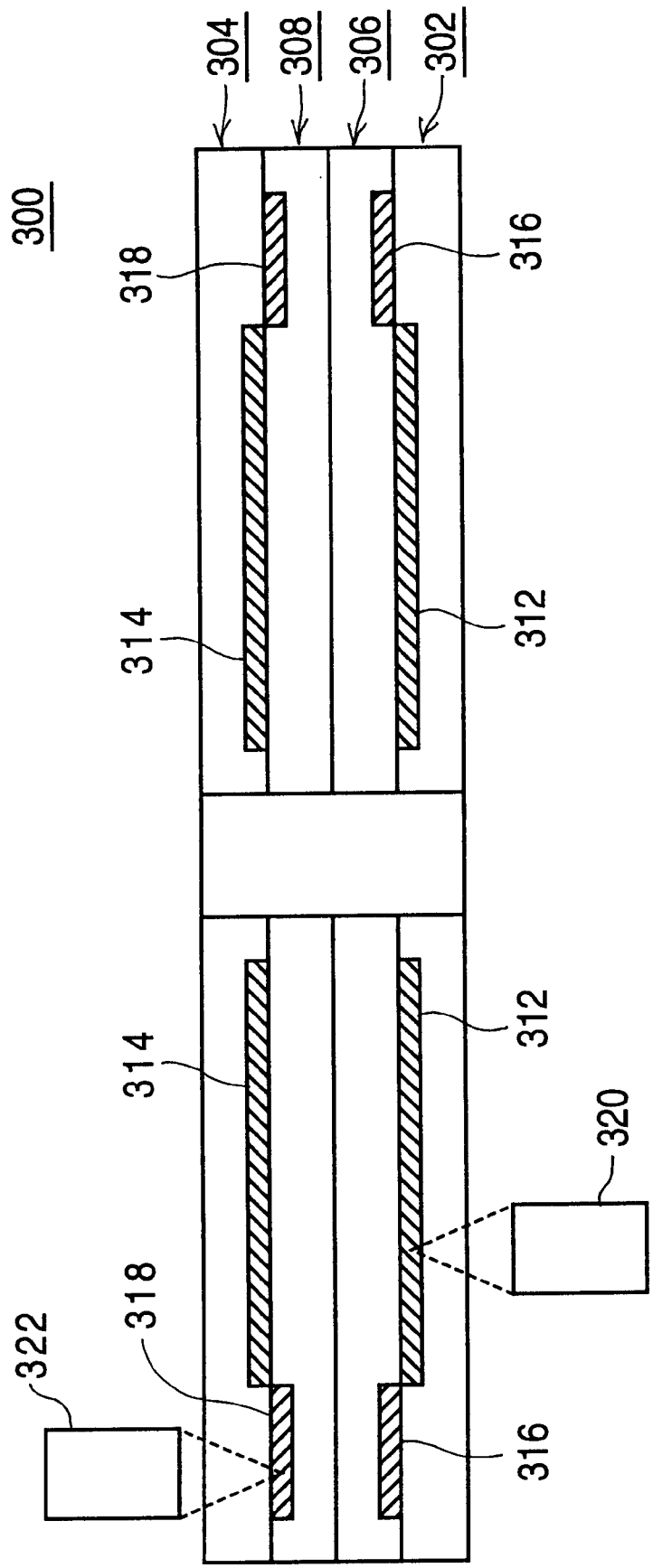
FIG. 7 shows a sectional view of an optical disc of 3rd embodiment of the present invention.

FIG. 7 shows a sectional view of an optical disc of 3rd embodiment of the present invention.

In FIG. 7, an optical disc 300 is comprised of adhered two optical discs 30, i.e. a first RAM disc 302, a first ROM disc 306, a second ROM disc 308, and a second RAM disc 304, which are adhered together. Two of the RAM discs, the first and the second RAM disc 302, 304, are provided on the exterior side of the optical disc 300.

An optical pickup 320 reproduces and/or records a signal on the first RAM disc 302 and the first ROM disc 306. Another optical pickup 322 reproduces and/or records a signal on the second RAM disc 304 and the second ROM disc 308.

ROM areas 316, 318 and RAM areas 312, 314 of the optical disc 300 are symmetrically disposed as shown in FIG. 7, which have an advantage that a warp thereof is minimized. But, there is no need to arrange them in that way mandatory. Moreover, number of adhered discs may not be limited to 4, but may be 3 or more than 4.

[4th Embodiment]

Figure 8:
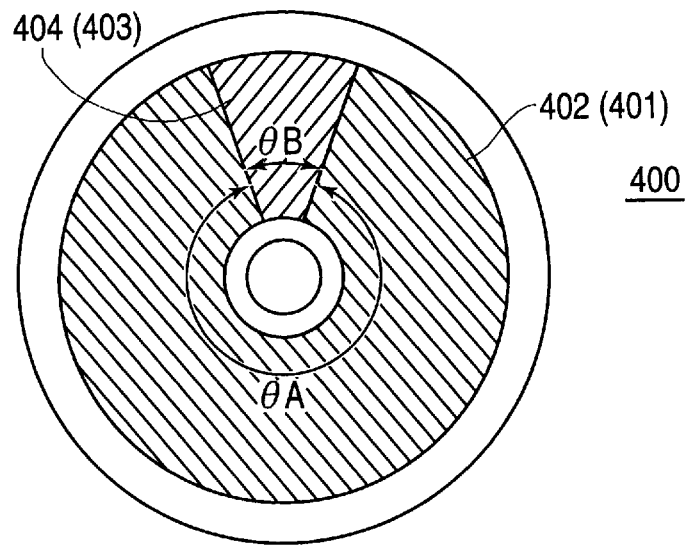
FIGS. 8(A) through 8(C) show plan views of optical discs of 4th embodiment of the present invention.
Figure 8:
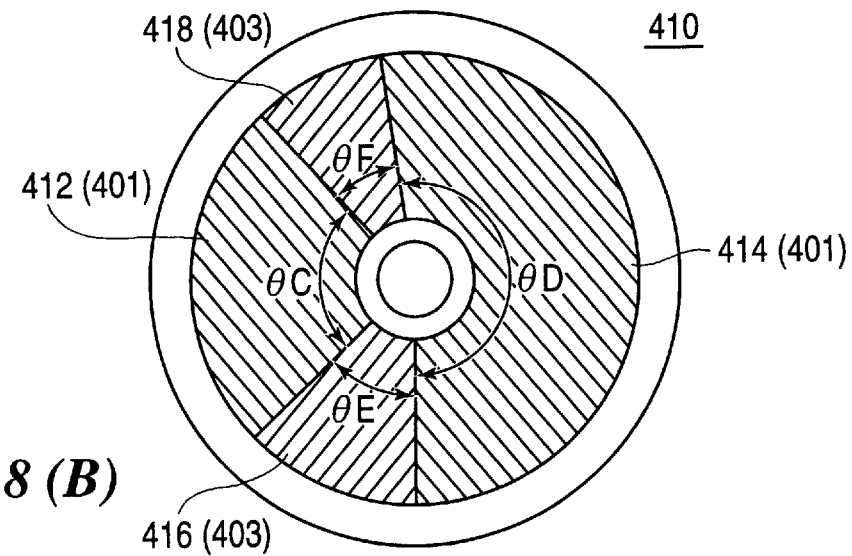
Figure 8:
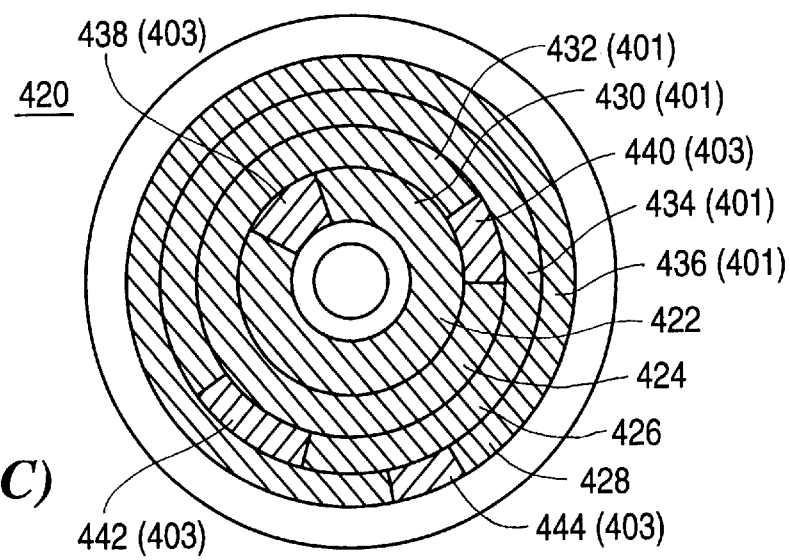

FIGS. 8(A) through 8(C) show plan views of optical discs of 4th embodiment of the present invention.

In this embodiment, an optical disc 400 (410, 420) is an adhered optical disc, comprised of a ROM disc 401 and a RAM disc 403, and ROM and RAM areas are arranged to be sectorial. In FIG. 8(A), a sector having an interior angle ΘA is a ROM area 402, and a sector having an interior angle ΘB is a RAM area 404. In this case, the ROM disc 401 is provided at the front side of the optical pickup (not shown). When the interior angle ΘB is smaller than ΘA, a guide groove for the RAM area 404 may not be needed, and tracking thereof is performed by maintaining the tracking information of the ROM area 402, which saves a part of manufacturing process of the optical disc 400. When a sector number of the RAM area 404 is preferred to be provided, the sector number may be provided on a boundary edge of the ROM area 402. With this configuration, a quick access response for recording and reproducing is performed as the ROM area 402 and the RAM area 404 are provided close each other. When the RAM area 404 is provided on the whole area of the optical disc 400, or provided to have larger interior angle than ΘB, adhering the two discs together is not necessarily precise, in other words, a critical angle fitting work in the manufacturing process of the optical disc 400 is lessened.

In FIG. 8(B), ROM areas 412, 414 are sectors having interior angles ΘC and ΘD respectively, and RAM areas 416, 418 are sectors having interior angles ΘE and ΘF respectively.

In FIG. 8(C), an optical disc 420 has plural annular zones 422, 424, 426, and 428, and a nominal rotation speed thereof varies depending on their radii, such as MCAV (modified constant angular velocity) and MCLV (modified constant linear velocity) discs. Sectors of ROM areas 430, 432, 434, and 436, and sectors of RAM areas 438, 440, 442, and 444 are provided on the plural annular zones 422, 424, 426, and 428 as shown. As shown above, the sectors of ROM and RAM areas are provided on annular zones because the rotation speed will vary from zone to zone in the MCAV or MCLV disc.

Although the present invention has been described with respect to the specific embodiments, the present invention is not limited to the above embodiments, but can also be adapted to various modifications of the subject matter of the present invention. There may be various constructions of the ROM area and the RAM area, for example, an additional layer may be provided between the ROM area and the substrate, or between the recording medium layer and the reflective layer. There are various materials available for the substrate, the recording medium, the reflective layer, the protective layer, and the adhesive. There may be various technologies of recording and reproducing, such as the phase change recording and the magneto-optical recording/reproducing. There may be various combinations of the embodiments of the above, for example, the ROM area and the RAM area may be annular on a part of the optical disc, and sectorial on another part thereof.

An application of the optical disc of the present invention is, for example, an optical disc which has a ROM area for memorizing various program such as a game program, or a spreadsheet program thereon, and a RAM area for recording a halfway or a final result of playing game or a table of the spreadsheet.

As mentioned in the foregoing, the embodiments of the present invention have advantages as follows.

An advantage of manufacturing method of an optical disc of the present invention is to manufacture a high density optical disc with a good repeatability by adhering a ROM disc and a RAM disc together, as the ROM disc and the RAM disc are manufactured independently under respective preferable conditions.

An advantage of an optical disc recording/reproducing apparatus of the present invention is to provide a simple structure thereof as only one optical pickup may record and/or reproduce an information signal of the optical disc.

Another advantage of the optical disc recording/reproducing apparatus of the present invention is to reduce an disturbance of a defect on the optical disc by providing the RAM disc facing closer to the optical pickup.

An advantage of an optical disc of the present invention is to cut down a focus control process of the optical pickup by reducing the thickness of the adhesive layer thinner than the focal depth of the optical pickup.

Another advantage of the optical disc of the present invention is to perform high speed recording or recording/reproducing by reducing a pickup access time when the ROM area and the RAM area are sectorial.

What is claimed is:

1. An optical disc comprising:
   a first disc manufactured to provide a read only memory (ROM) area thereon; a second disc manufactured to provide a random access memory (RAM) area thereon;
   each of said ROM area and said RAM area being selected from one group of divided annular regions and divided sectorial regions on said respective first and second discs; and
   adhering means for adhering said first disc and said second disc to each other such that said ROM area and said RAM area do not overlap each other in said optical disc.

2. An optical disc as claimed in claim 1, wherein the thickness of said adhering means is less than a focal depth of a light beam emitted from an optical pickup for recording/reproducing information on/from said optical disc.

3. An optical disc recording/reproducing apparatus comprising;
   a first disc manufactured to provide a read only memory (ROM) area thereon;
   a second disc manufactured to provide a random access memory (RAM) area thereon;
   each of said ROM area and said RAM area being selected from one group of divided annular regions and divided sectorial regions on said respective first and second discs;
   adhering means for adhering said first disc and said second disc to each other such that said ROM area and said RAM area do not overlap each other in said optical disc; and
   an optical pickup for reproducing said ROM disc and for recording and reproducing said RAM disc, wherein at least one of a pit, a guide groove, a reflective layer, and a recording layer is provided on one of said first and said second discs, which receives an incoming light of said optical pickup through the other one of said first and second discs.

4. An optical disc recording/reproducing apparatus as claimed in claim 3, wherein the thickness of said adhering means is less than a focal depth of said incoming light.

5. An optical disc as claimed in claim 1, wherein said RAM area is sectorial and has no tracking information.

6. An optical disc recording/reproducing apparatus as claimed in claim 3, wherein said first disc receives said incoming light through said second disc.

7. A method of manufacturing an optical disc comprised of a first disc provided with a read only memory (ROM) area thereon, a second disc provided with a random access memory (RAM) area thereon, each of said ROM area and said RAM area being selected from one group of divided annular regions and divided sectorial regions on the respective first and second discs, adhering means for adhering said first disc and second disc to each other, and said ROM area and said RAM area positionally differing from each other in said optical disc, said method comprising the steps of:

manufacturing said first disc under desired conditions thereof and separately from said second disc;

manufacturing said second disc under desired conditions thereof and separately from said first disc; and adhering said first disc and said second disc together.

8. An optical disc recording/reproducing apparatus as claimed in claim 3, wherein said optical pickup for reproducing said ROM disc and for recording and reproducing said RAM disc is provided at one side of said optical disc.

* * * * *